United States Patent [19]
Turra et al.

[11] Patent Number: 5,391,125
[45] Date of Patent: Feb. 21, 1995

[54] EPICYCLIC SPEED REDUCER DESIGNED FOR FITMENT TO THE TRANSMISSION BETWEEN THE GAS TURBINE AND AIR COMPRESSOR OF AN AIRCRAFT ENGINE

[75] Inventors: Sergio Turra, Turin; Valter Bologna, Grugliasco, both of Italy

[73] Assignee: Fiat Avio S.p.A., Turin, Italy

[21] Appl. No.: 975,414

[22] Filed: Nov. 12, 1992

[30] Foreign Application Priority Data

Nov. 12, 1991 [IT] Italy .......................... T091A 000871

[51] Int. Cl.⁶ ............................................. F16H 1/28
[52] U.S. Cl. ..................................... 475/346; 475/331
[58] Field of Search .......................... 475/317, 331, 346

[56] References Cited

U.S. PATENT DOCUMENTS

| | | | |
|---|---|---|---|
| 801,517 | 10/1905 | Fairfax | 475/331 X |
| 1,418,119 | 5/1922 | Wolcott | 475/331 |
| 1,442,795 | 1/1923 | Cook et al. | 475/331 X |
| 4,074,591 | 2/1978 | Dick | 475/317 X |
| 4,856,377 | 8/1989 | Goudreau et al. | 475/331 X |
| 5,074,832 | 12/1991 | Igaku | 475/317 |
| 5,102,379 | 4/1992 | Pagluica et al. | 475/331 |

FOREIGN PATENT DOCUMENTS

| | | | |
|---|---|---|---|
| 905259 | 11/1945 | France | 475/317 |
| 58-214049 | 12/1983 | Japan | 475/331 |
| 58-217851 | 12/1983 | Japan | 475/331 |
| 63-214543 | 9/1988 | Japan | 475/331 |
| 1-108447 | 4/1989 | Japan | 475/331 |
| 2-253031 | 10/1990 | Japan | 475/317 |
| 3-51554 | 3/1991 | Japan | 475/331 |
| 691776 | 5/1953 | United Kingdom | 475/331 |
| 1391978 | 4/1988 | U.S.S.R. | 475/331 |

*Primary Examiner*—Andrea L. Pitts
*Attorney, Agent, or Firm*—Ladas & Parry

[57] ABSTRACT

A speed reducer has a sun gear for connection to a turbine of an engine and a planet carrier supporting a number of planetary gears meshing with the sun gear and with the ring gear fitted to the engine mounting. According to the present invention, the planet carrier has a first annular element having pairs of seats for pins on each of which rotates one of the planetary gears. A second annular element for connection to a compressor of the engine has a number of axial arms fitted inside respective cavities of the first annular element. An end of each axial arm is connected to a portion of the first annular element that is substantially equidistant between to the seats of each of the pairs of seats.

13 Claims, 5 Drawing Sheets

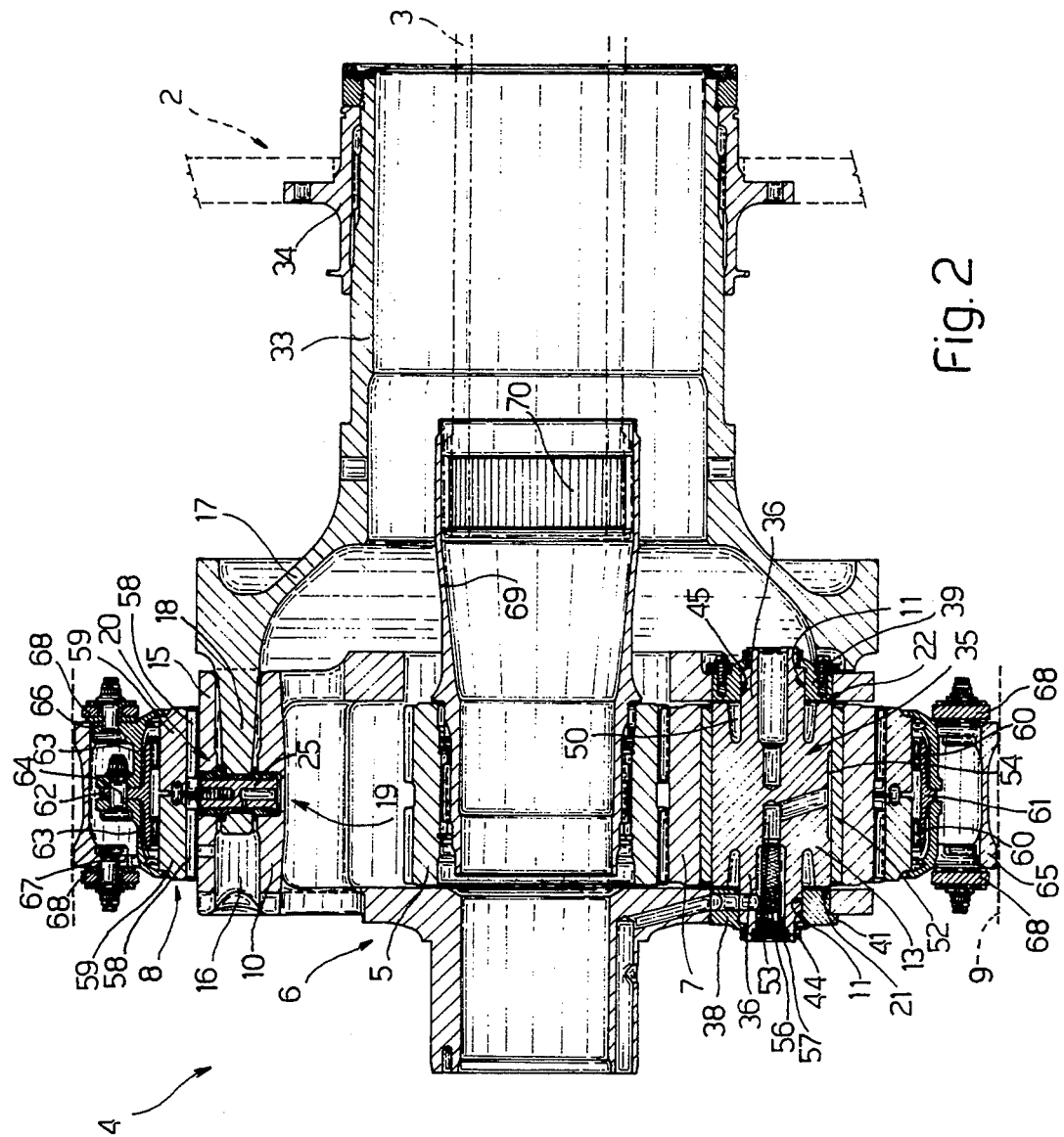

EPICYCLIC SPEED REDUCER DESIGNED FOR FITMENT TO THE TRANSMISSION BETWEEN THE GAS TURBINE AND AIR COMPRESSOR OF AN AIRCRAFT ENGINE

BACKGROUND OF THE INVENTION

The present invention relates to an epicyclic speed reducer designed for fitment to the transmission between the gas turbine and air compressor of an aircraft turbine engine.

On engines of the aforementioned type, the air compressor is driven by the turbine via a transmission shaft. For achieving high performance of the turbine and compressor, however, the rotation speed of the compressor must be lower than that of the turbine, for which purpose, the transmission between the turbine and compressor normally features a speed reducer substantially comprising a sun gear connected to the turbine, a planet carrier coaxial with the sun gear and supporting a number of planetary gears meshing with the same, and a ring gear fitted to the engine mounting and with which the planetary gears mesh. The planet carrier, which constitutes the output element of the reducer, is connected to the compressor via rigid connecting means of fairly complex design.

Epicyclic reducers of the aforementioned type present several drawbacks.

Foremost of these is the in-service deformation, at times even severe, to which the planet carrier is subject and which may affect the geometry of the carrier and, consequently, uniform pressure distribution between the teeth of the reducer gears. This is due to the above connecting means, which provide for transmitting torque between the planet carrier and the air compressor, exerting severe stress on the connecting portions of the carrier and the connecting means themselves. As said connecting portions are located on a lateral surface of the planet carrier, while the resultants of the forces transmitted between the gear teeth lie substantially in the mid plane of the carrier, a highly complex stress distribution pattern resulting in severe deformation is originated inside the carrier.

Moreover, during operation of the reducer, severe flexural deformation is also encountered on the pins supporting the planetary gears, which deformation also has a negative effect on pressure distribution between the teeth of the reducer gears.

Finally, uniform pressure distribution between the teeth of the reducer gears is also impaired by the connection of the ring gear on the reducer to the engine mounting, which connection is normally made using rigid connecting means allowing substantially no displacement of the ring gear in response to deformation on the other components of the reducer.

SUMMARY OF THE INVENTION

It is an object of the present invention to provide an epicyclic speed reducer of the type described above, designed to overcome the aforementioned drawbacks.

According to the present invention, there is provided an epicyclic speed reducer designed for fitment to the transmission between the gas turbine and air compressor of an aircraft turbine engine, said reducer comprising a sun gear connected to said turbine; a planet carrier coaxial with said sun gear and supporting a number of planetary gears meshing with said sun gear; and a ring gear fitted to the engine mounting and with which said planetary gears mesh; said planet carrier being connected to said compressor; characterized by the fact that said planet carrier comprises:

a first substantially annular element having a number of pairs of seats for pins on each of which rotates one of said planetary gears; and a number of cavities, each interposed between two contiguous planetary gears;

a second annular element connected to said compressor and having a number of axial arms, each designed to fit inside one of said cavities on said first element;

connecting means for connecting the end of each said arm to a portion of said first element, which portion is substantially equidistant in relation to the seats in each of said pairs of seats of said pins.

BRIEF DESCRIPTION OF THE DRAWINGS

The speed reducer according to the present invention will be described, by way of example, with reference to the accompanying drawings, in which:

FIG. 2 shows a longitudinal section of the reducer;

DETAILED DESCRIPTION OF THE INVENTION

Figure 1:
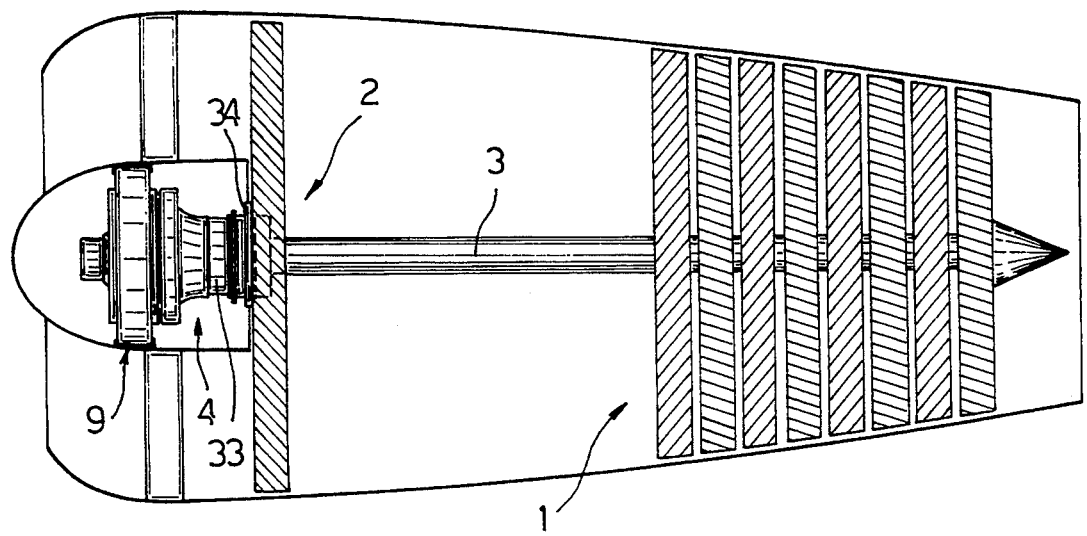
FIG. 1 shows a schematic view of an aircraft turbine engine fitted with a speed reducer in accordance with the present invention.
Figure 7:
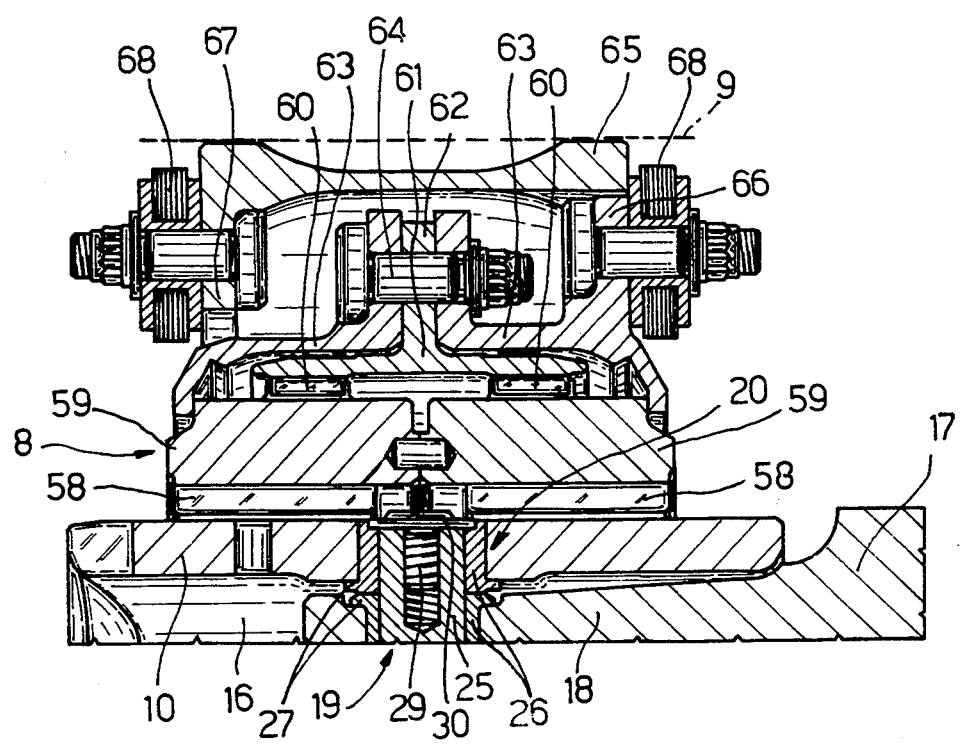
FIGS. 5, 6 and 7 show enlarged details of the FIG. 2 section.

The epicyclic speed reducer according to the present invention is designed for use on an aircraft turbine engine of the type shown schematically in FIG. 1, and which comprises a gas turbine 1 and an air compressor 2 driven by turbine 1. Compressor 2 is connected to turbine 1 by a transmission shaft 3, and the speed reducer, indicated as a whole by 4, is fitted between shaft 3 and compressor 2.

As shown in FIG. 2, reducer 4 substantially comprises a sun gear 5 connected to shaft 3 as described later on; and a planet carrier 6 coaxial with sun gear 5 and supporting a number of planetary gears 7 meshing with sun gear 5 and with a ring gear 8 fitted to engine mounting 9 as described later on.

Figure 3:
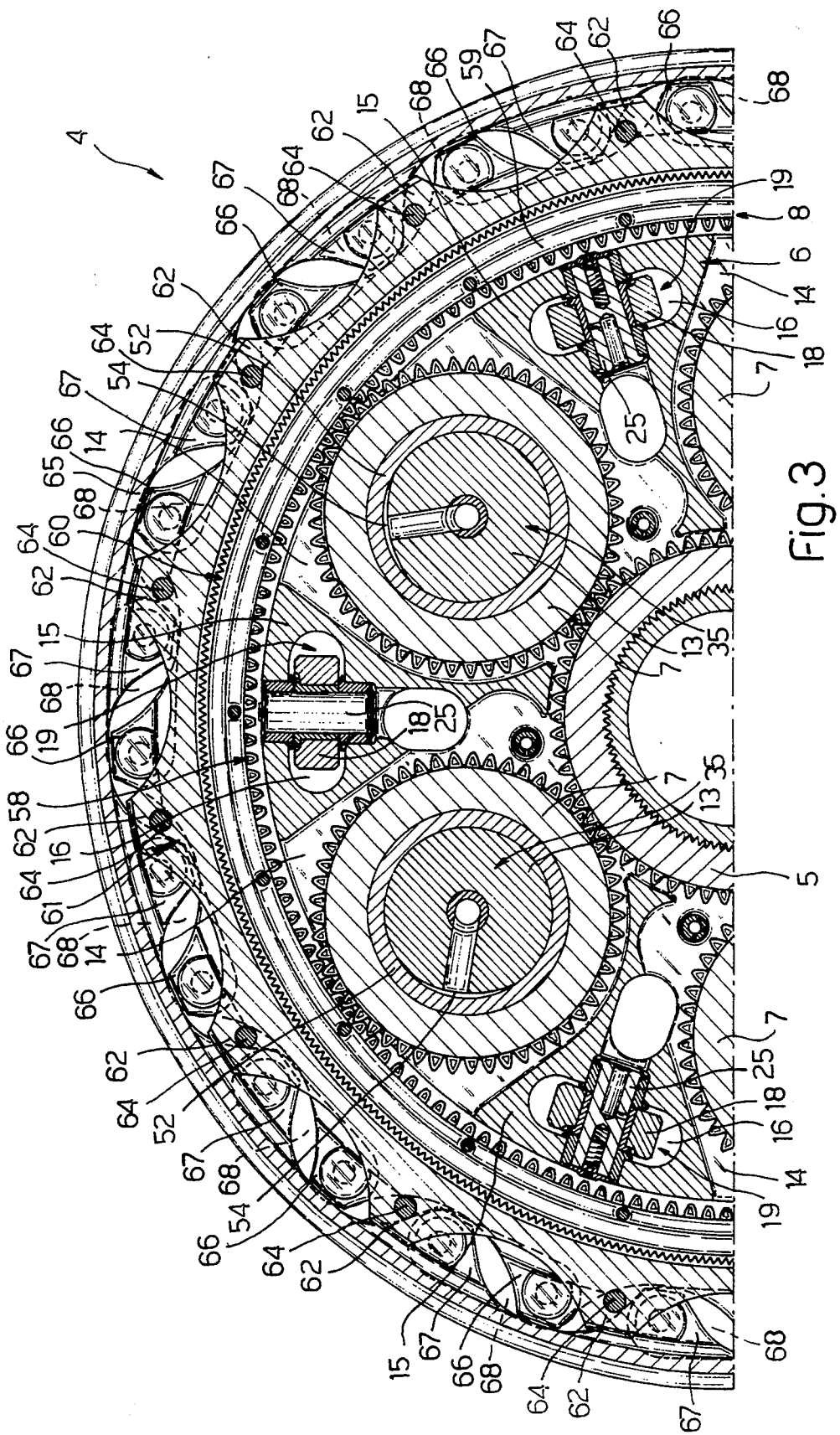
FIG. 3 shows a section of the reducer along line III—III in FIG 2.
Figure 4:
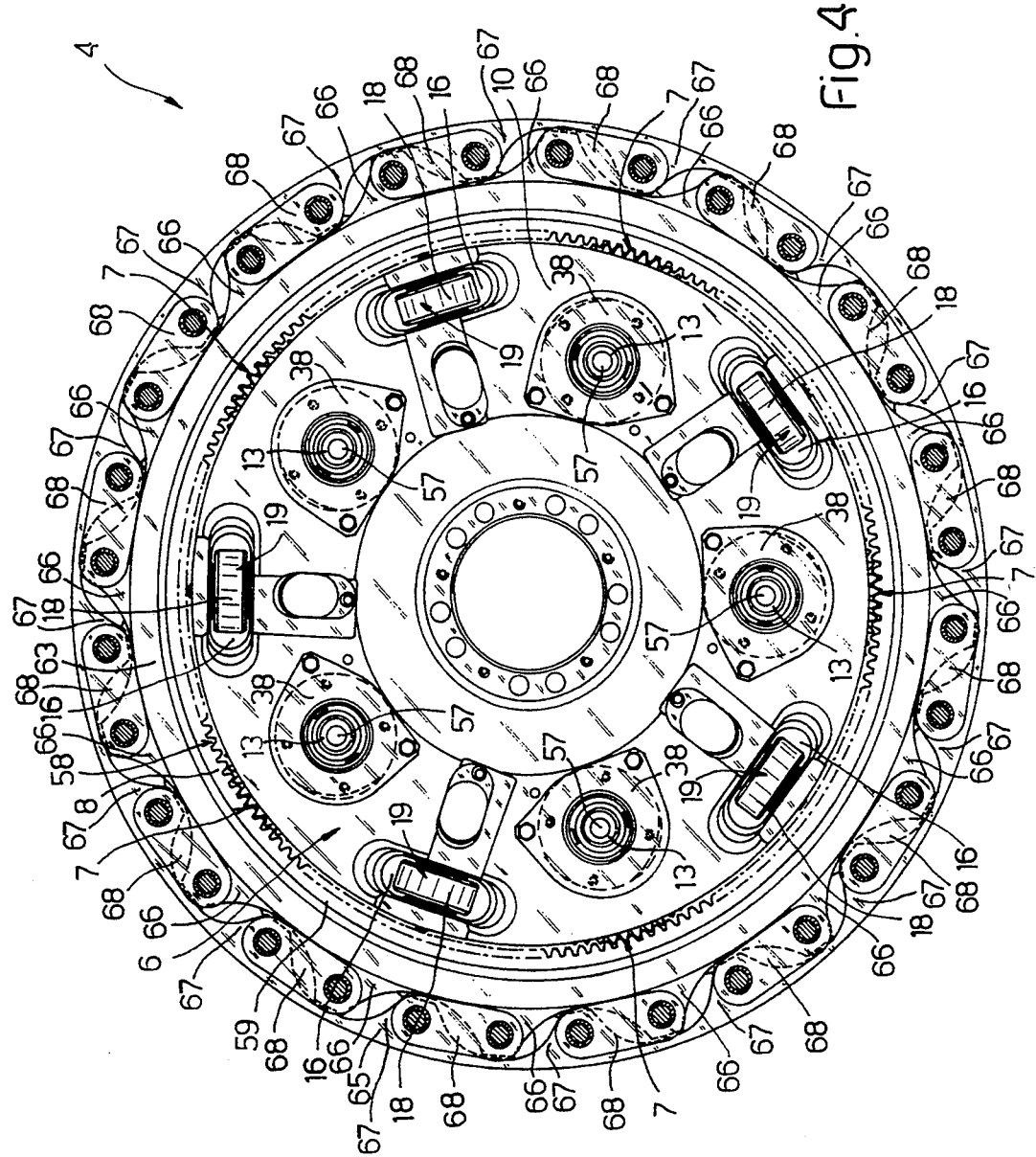
FIG. 4 shows a side view of the reducer.

According to the present invention, planet carrier 6 comprises a first annular element 10 fitted with pins 13 supported at the ends in seats 11 formed in two lateral walls of carrier 6. Planetary gears 7 rotate on pins 13 and, as shown in FIG. 3, are housed inside respective cavities 14 formed in carrier 6. In the embodiment shown, provision is made for five planetary gears separated by a bridge 15 defined by the material of element 10.

First annular element 10 also comprises a number of cavities 16, each formed in a respective bridge 15 and therefore interposed between two contiguous planetary gears 7.

Planet carrier 6 also comprises a second substantially annular element 17 connected to compressor 2 as described later on and having a number of axial arms 18, each designed to fit inside one of cavities 16 on element 10, as shown in FIG. 2.

Planet carrier 6 also comprises connecting means 19 for connecting the end of each arm 18 to a portion of element 10 indicated by 20 and substantially equidistant in relation to seats 11 of pins 13. The teeth of planetary gears 7 are defined frontwards by surfaces 21 and 22, each located to the side of a respective seat 11.

Connecting means 19 substantially comprise a hinge, the axis of which is positioned radially in relation to the reducer axis and is equidistant in relation to seats 11.

Figure 6:
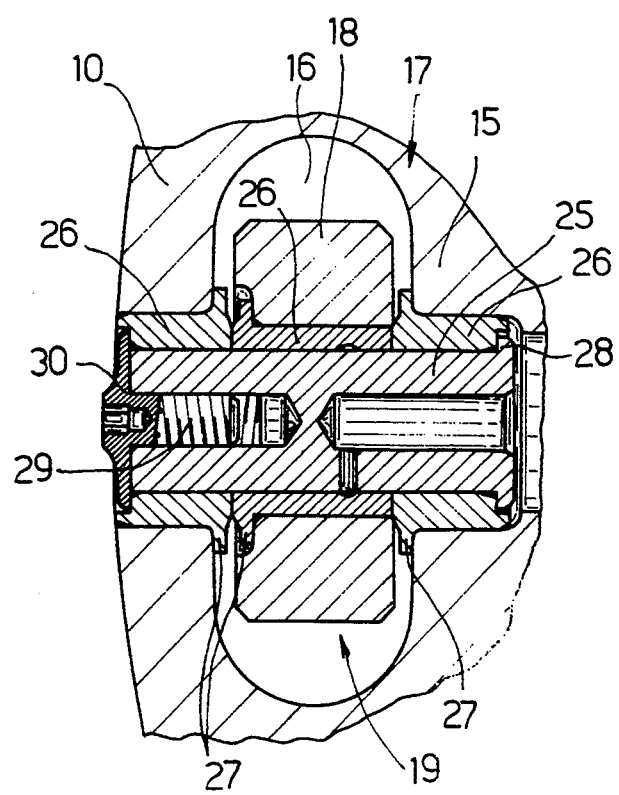

Each arm 18 of element 17 presents a substantially rectangular section (FIG. 3), and the hinge of connecting means 19 comprises a radial pin 25 (FIG. 6) inserted inside respective radial holes in element 17 and arm 18. Between pin 25 and said radial holes, there are inserted bushings 26: one between pin 25 and the hole in arm 18, and a further two between pin 25 and the hole in element 17. Bushings 26 conveniently present a shoulder collar 27. Pin 25 presents an annular projection 28 designed to rest on one of bushings 26; and a screw 29, the head 30 of which rests on the shoulder of one of bushings 26, is screwed inside a threaded hole in pin 25 so as to lock the assembly consisting of pin 25 and the three bushings 26 on to element 17.

Element 10 of planet carrier 6 presents a sleeve 33 (FIG. 2) connected by a flange 34 to air compressor 2 and which, as shown in FIG. 2, projects axially from element 10 on the opposite side to that from which arms 18 project.

Figure 5:
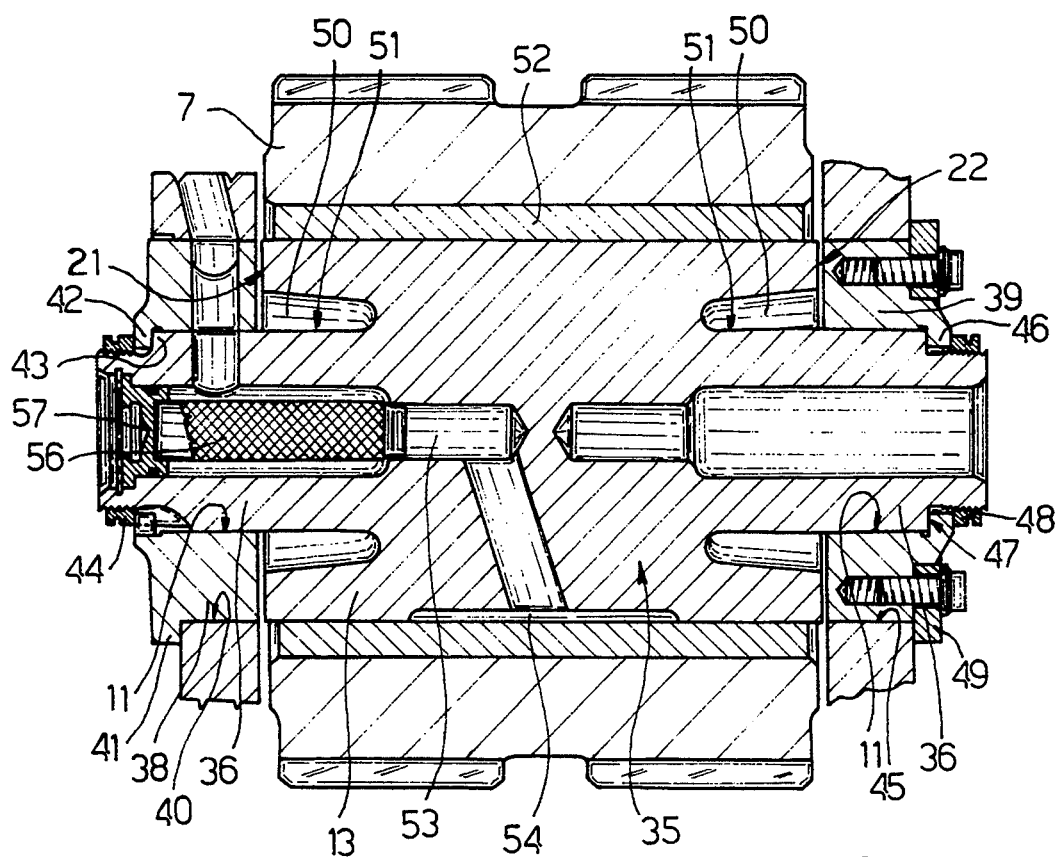

Each of pins 13 on which planetary gears 7 rotate presents a cylindrical central portion 35 (FIG. 5) constituting a supporting seat for a respective planetary gear 7; and two cylindrical end portions 36 smaller in diameter than central portion 35 and each force fitted inside a seat 11 formed in a respective cover 38, 39 fitted to element 10. Cover 38 is housed in a seat 40 on element 10, and presents a radial projection 41, and a further radial projection 42 resting on shoulder 43 of one of portions 36 of pin 13 and locked to the same by a threaded ring nut 44. Cover 39, also housed in a seat 45 on element 10, presents a radial projection 46 resting on shoulder 47 of one of portions 36 and locked to the same by a ring nut 48. The assembly consisting of pin 13 and covers 38 and 39 is prevented from moving axially rightwards by projection 41, and from moving axially leftwards by a ring 49 fitted by means of screws to cover 39.

According to the present invention, cylindrical central portion 35 of each pin 13 presents two annular grooves 50, each open on the side facing a respective cylindrical portion 36, and each defined by a surface 51 blending with the outer surface of portion 36. The axial depth of each groove 50 is conveniently equal to at least a fifth of the axial length of central portion 35 of pin 13.

Between each pin 13 and respective planetary gear 7, there is inserted a bushing 52 force fitted inside planetary gear 7; and, inside element 10, cover 38 and each pin 13, there is formed a conduit 53 (FIG. 5) for feeding pressurized oil into a cavity 54 on the surface of cylindrical central portion 35, and which is conveniently fitted with a filter 56 locked by a cover 57.

The gears forming part of the epicyclic train conveniently present two sets of helical teeth, as shown in FIG. 2. Ring gear 8 therefore also presents two sets of internal helical teeth 58, and comprises two rings 59, each supporting, on the inside, one of the above sets of teeth, and, on the outside, a set of external teeth 60 meshing with corresponding teeth on a sleeve 61 having an annular rib 62 to which are fitted two shoulder rings 63. Each ring 63 provides for axially locking one of rings 59 on sleeve 61 by means of bolts 64.

The reducer also comprises an annular box 65 fitted in any appropriate manner to engine mounting 9 and housing rings 59, sleeve 61 and shoulder rings 63. Each shoulder ring 63 presents a number of outward radial projections 66 (FIGS. 2 and 3), and annular box 65 two sets of inward radial projections 67. Between each projection 66 on one of shoulder rings 63 and a corresponding projection 67 on box 65, there is inserted at least one flexible blade 68. Each blade 68 is bolted to said projections as shown in FIG. 2; and, instead of a single blade 68, packs of blades may be used, or these may be replaced by rings (or packs of rings) connected as described above to projections 66 and 67. Blades (or rings) 68 thus provide for elastically connecting rings 59 and box 65 and so enabling both axial and radial displacement of rings 59 in relation to box 65, as well as variations in the angular position of the rings and box.

Sun gear 5 presents a hollow shaft 69 (FIG. 2) housed substantially inside sleeve 33 of element 17 and having convex internal teeth 70 meshing with convex teeth formed on the outer surface of shaft 3 of turbine 1, so as to form a joint also enabling variations in the angular position of hollow shaft 69 and shaft 3.

The reducer according to the present invention operates as follows.

Shaft 3, driven by turbine 1, rotates sun gear 5, which in turn rotates planetary gears 7. These mesh with ring gear 8, which is fixed in relation to the engine mounting, so as to rotate planet carrier 6 and so drive air compressor 2.

During operation of the reducer, despite considerable pressure being exchanged between planetary gears 7 and respective pins 13, pins 13 have been found to undergo substantially no flexural deformation, by virtue of the design and restraint conditions of the pins. Indeed, the presence of grooves 50 formed in central portion 35 of each pin 13 has been found to contribute decisively towards reducing flexural deformation of the pin, which is also reduced by the presence of smaller-diameter end portions 36 and the manner in which portions 36 are restrained (fitted) inside seats 11 formed in covers 38, 39 integral with element 10.

During operation of the reducer, an extremely high torque is transmitted by planetary gears 7 to first element 10 of planet carrier 6, and from element 10 via connecting means 19 to arms 18 of second element 17. Consequently, first annular element 10 is subjected by each pin 13 to tangential forces at seats 11 in which end portions 36 of pin 13 are fitted; and arms 18 are subjected by radial pins 25 of connecting means 19 to further tangential forces lying substantially in a plane perpendicular to the reducer axis and equidistant in relation to the planes of the tangential forces exchanged between end portions 36 of pins 13 and seats 11. Element 10 is thus subjected to a perfectly symmetrical system of forces resulting in substantially no deformation of element 10 which may possibly affect pressure distribution between the teeth of planetary gears 7, sun gear 5 and ring gear 8. During operation, therefore, pressure distribution between the gear teeth is substantially unaffected, and no dangerous buildup of pressure produced.

Finally, the elastic connection between rings 59 and box 25 enables a small amount of displacement of rings 59 in relation to box 25, for compensating for errors in assembly and any displacement (axial, transverse and angular) occurring during operation of the reducer. As such, pressure distribution between the teeth of planetary gears 7 and ring gear 8 also remains unaffected during operation.

To those skilled in the art it will be clear that changes may be made to the speed reducer as described and illustrated herein without, however, departing from the scope of the present invention.

We claim:

1. An epicyclic speed reducer designed for fitment to a transmission between a gas turbine and air compressor of an aircraft turbine engine, said reducer comprising a sun gear (5) connected to said turbine; a planet carrier (6) connected to said air compressor coaxially to said sun gear (5) and supporting a number of planetary gear (7) meshing with one of said sun gear (5); and a ring gear (8) fitted to a mounting (9) of said engine and with which said planetary gear (7) mesh; characterized by the fact that said planet carrier (6) comprising a first annular element (10) having a number of pairs of seats (11) for pins (13) on each of which rotates one of said planetary gears (7), and a number of holes (16) each interposed between two continuous planetary gears (7); a second annular element (17) connected to said compressor and having a number of cantilever axial arms (18), each designed to fit inside one of said holes (16) on said first element (10); connecting means (19) for connecting the end of each said cantilever axial arms (18) to a portion (20) of said first element (10), which portion (20) is substantially equidistant in relation to these seats (11) in each said pair of seats of said pins (13); said connecting means comprising a hinge (19) having a proper axis which is positioned radially in relation to a reducer axis, and is equidistant in relation to the seats (11) in each said pair of seats of said pins (13).

2. A speed reducer as claimed in claim 1, characterized by the fact that each said arm (18) presents a rectangular section, and said hinge comprises a radial pin (25) inserted inside a radial hole on said first element (10) and inside a hole on said arm (18); bushings (26) being inserted between said pin (25) and said holes.

3. A speed reducer as claimed in claim 1, characterized by the fact that said arms project from one side of said second element (17) and said second element (17) presents a sleeve (33) connected to said air compressor and projecting from an opposite side of said second element (17).

4. A speed reducer as claimed in claim 1, characterized by the fact that each of said pins (13) on which rotate said planetary gears (7) presents a cylindrical central portion (35) constituting a supporting seat for a respective said planetary gear (7); and two cylindrical end portions (36) smaller in diameter than said central portion (35) and each force fitted inside a respective said seat (11) on said first element (10) of said planet carrier (6); said central portion (35) presenting two annular grooves (50), each open on a side facing a respective end portion (36) and each defined by a surface (51) blending with an outer surface of said end portion (36).

5. A speed reducer as claimed in claim 4, characterized by the fact that an axial depth of each said annular groove (50) is at least equal to 1/5 of the axial length of said central portion (35) of said pin (13).

6. A speed reducer as claimed in claim 4, characterized by the fact that, between each said pin (13) and respective said planetary gear (7), there is inserted a bushing (52) force fitted inside said planetary gear (7).

7. A speed reducer as claimed in claim 1, characterized by the fact that said ring gear (8) is fitted to said mounting (9) by means of elastic connecting elements.

8. A speed reducer as claimed in claim 7, characterized by the fact that said elastic connecting elements comprise flexible blades (68) arranged about said ring gear (8) and each having one end fitted to said ring gear (8) and an opposite end fitted to said mounting (9).

9. A speed reducer as claimed in claim 7, characterized by the fact that said elastic elements comprise flexible rings coaxial with said ring gear (8) and fitted to one of said ring gear (8) and said mounting (9).

10. A speed reducer as claimed in claim 1, wherein said sun gear (5) and said planetary gears (7) comprise two sets of external helical teeth; characterized by the fact that said ring gear (8) comprises two rings (59), each having internal helical teeth meshing with one of said sets of teeth on said planetary gears, and external teeth meshing with internal teeth on a sleeve (61) having an annular rib (62) to which are fitted two shoulder rings (63), each of which provides for axially locking one of said rings (59) to said sleeve (61).

11. A speed reducer as claimed in claim 10, characterized by the fact that it comprises an annular box (65) fitted to said mounting (9) and housing said rings (59), said sleeve (61) and said shoulder rings (63); each said shoulder ring (63) presenting a number of outward radial projections; said annular box (65) presenting two sets of inward radial projections (67); and at least one flexible blades (68) being inserted between each said projection (66) on one of said shoulder rings (63) and a corresponding radial projection (67) on said box (65).

12. A speed reducer as claimed in claim 1, characterized by the fact that said sun gear (5) presents a hollow shaft (69) housed substantially inside said sleeve (33) of said planet carrier (6); said hollow shaft (69) presenting convex internal teeth (70) meshing with convex teeth on a shaft (3) of said turbine.

13. A planet carrier for an epicyclic speed reducer between a gas turbine and air compressor of an aircraft turbine engine, said speed reducer having a sun gear (5) for connection to said gas turbine and a ring gear (8) for fitting to a mounting (9) of said engine, said planet carrier (6) being for connection to said air compressor coaxially of said sun gear (5) and for supporting planetary gears (7) meshing with said sun gear and said ring gear, said planet carrier (6) comprising:

a first annular element (10) having an axis and pairs of seats (11) on axially opposite sides;

pins (13) respectively in said seats for each pin to rotatably carry a planetary gear (7);

holes (16) in said first annular element respectively interposed between each adjacent two of said planetary gears (7);

a second annular element (17) for connection to a compressor and having a number of cantilever axial arms (18) respectively fitting inside said holes (16) with clearance; and connecting means (19) respectively connecting respective ends of said cantilever axial arms (18) to respective portions (20) of said first annular element (10) that are substantially equidistant between said seats (11) of respective of said pairs of seats, each said connecting means comprising a hinge (19) having an axis positioned radially in relation to said axis of said first annular element and equidistant said seats (11) of said respective of said pair of seats.

* * * * *